(12) United States Patent
Ray et al.

(10) Patent No.: US 11,645,812 B2
(45) Date of Patent: *May 9, 2023

(54) INTER-COMPONENT RESIDUAL PREDICTION FOR COLOR ATTRIBUTES IN GEOMETRY POINT CLOUD COMPRESSION CODING

(71) Applicant: QUALCOMM Incorporated, San Diego, CA (US)

(72) Inventors: Bappaditya Ray, San Diego, CA (US); Adarsh Krishnan Ramasubramonian, Irvine, CA (US); Geert Van der Auwera, Del Mar, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/484,525

(22) Filed: Sep. 24, 2021

(65) Prior Publication Data

US 2022/0109816 A1 Apr. 7, 2022

Related U.S. Application Data

(60) Provisional application No. 63/088,345, filed on Oct. 6, 2020.

(51) Int. Cl.
*G06T 17/00* (2006.01)
*G06T 9/00* (2006.01)
(Continued)

(52) U.S. Cl.
CPC ............ *G06T 17/00* (2013.01); *G06T 9/00* (2013.01); *G06T 19/20* (2013.01); *H04N 13/161* (2018.05);
(Continued)

(58) Field of Classification Search
None
See application file for complete search history.

(56) References Cited

U.S. PATENT DOCUMENTS

| 2011/0102460 A1* | 5/2011 | Parker ............ A63F 13/79 |
| | | 707/E17.044 |
| 2015/0016512 A1* | 1/2015 | Pu ............ H04N 19/61 |
| | | 375/240.03 |

(Continued)

FOREIGN PATENT DOCUMENTS

| WO | 2019195921 A1 | 10/2019 |
| WO | 2020189982 A1 | 9/2020 |

OTHER PUBLICATIONS

Ali Khairat, Tung Nguyen, Mischa Siekmann, Detlev Marpe, Thomas Wiegand, "Adaptive Cross-Component Prediction for 4:4:4 High Efficiency Video Coding", Oct. 30, 2014, IEEE, 2014 IEEE International Conference on Image Processing (ICIP), pp. 3734-3738.*

(Continued)

*Primary Examiner* — Robert Bader
(74) *Attorney, Agent, or Firm* — Shumaker & Sieffert, P.A.

(57) ABSTRACT

A device for decoding encoded point cloud data can be configured to, for a point of a point cloud, determine a first color value for a first color component based on a first predicted value and a first residual value; apply a scaling factor to the first residual value to determine a predicted second residual value, wherein the scaling factor has one or both of a non-integer value or an absolute value greater than one; for the point of the point cloud, receive a second residual value in the encoded point cloud data; determine a final second residual value based on the predicted second (Continued)

residual value and the received second residual value; and for the point of the point cloud, determine a second color value for a second color component based on a second predicted value and the final second residual value.

38 Claims, 9 Drawing Sheets

(51) Int. Cl.
　　*G06T 19/20*　　(2011.01)
　　*H04N 13/161*　　(2018.01)
　　*H04N 19/70*　　(2014.01)
　　*H04N 19/186*　　(2014.01)
　　*H04N 19/50*　　(2014.01)

(52) U.S. Cl.
　　CPC .......... *H04N 19/186* (2014.11); *H04N 19/50* (2014.11); *H04N 19/70* (2014.11); *G06T 2210/36* (2013.01); *G06T 2219/2016* (2013.01)

(56) References Cited

U.S. PATENT DOCUMENTS

| | | | |
|---|---|---|---|
| 2015/0373349 A1 | 12/2015 | Zhang et al. | |
| 2016/0080751 A1* | 3/2016 | Xiu | H04N 19/157 375/240.02 |
| 2017/0318301 A1* | 11/2017 | Li | H04N 19/70 |
| 2018/0306588 A1* | 10/2018 | Bjorke | G01C 21/206 |
| 2019/0156518 A1 | 5/2019 | Mammou et al. | |
| 2019/0226853 A1* | 7/2019 | Kubiak | G01S 17/06 |
| 2020/0219290 A1 | 7/2020 | Tourapis et al. | |
| 2020/0279404 A1 | 9/2020 | Vosoughi et al. | |
| 2021/0104072 A1* | 4/2021 | Yea | G06T 3/40 |
| 2022/0108479 A1 | 4/2022 | Ray et al. | |

OTHER PUBLICATIONS

International Search Report and Written Opinion—PCT/US2021/052252—ISA/EPO—dated Jan. 4, 2022.
ITU-T H.265: "Series H: Audiovisual and Multimedia Systems, Infrastructure of Audiovisual Services—Coding of Moving Video, High Efficiency Video Coding", The International Telecommunication Union, Jun. 2019, 696 Pages.
Pu (Qualcomm) W., et al., "RCE1: Descriptions and Results for Experiments 1, 2, 3, and 4," 15 JCT-VC Meeting: JCTVC-O0202_v3, Oct. 25, 2013-Nov. 1, 2013; Geneva; (Joint Collaborative Team on Video Coding of ISO/IEC JTC1/SC29/WG11 and ITU-TSG.16), No. JCTVC-O0202 Nov. 11, 2013 (Nov. 11, 2013), XP030238913, 10 pages, Retrieved from the Internet: URL: http://phenix.int-evry.fr/jct/doc_end_user/documents/15_Geneva/wg11/JCTVC-O0202-v5.zip JCTVC-O0202_r4.doc [retrieved on Nov. 11, 2013].
3DG: "G-PCC Codec Description v6," Coding of Moving Pictures and Audio, ISO/IEC JTC1/SC29/WG11, N19091, Jan. 2020, Brussels, BE, Mar. 27, 2020, 92 pages.
Ray B (Qualcomm)., et al., "[G-PCC][New] On Inter-Component Residual Prediction," 132, MPEG Meeting, Oct. 12, 2020-Oct. 16, 2020, Online, (Motion Picture Expert Group or ISO/IEC JTC1/SC29/WG11), No. M55373, Oct. 7, 2020, XP030292897, 2 Pages.
"Text of ISO/IEC 23090-9 DIS Geometry-Based Point Cloud Compression," 129. MPEG Meeting, Jan. 13, 2020-Jan. 17, 2020, Brussels, (Motion Picture Expert Group or ISO/IEC JTC1/SC29/WG11), No. n19088, Apr. 20, 2020 (Apr. 20, 2020), XP030287970, 126 Pages, Retrieved from the Internet: URL:http://phenix.int-evry.fr/mpeg/doc_end_user/documents/129_Brussels/wg11/w19088.zip w19088_d10_clean.pdf [retrieved on—Apr. 20, 2020] Sections 8.2.4. 8.2.5.
Yea S., et al., "[G-PCC] EE13. 7 Report on Inter-Channel Prediction for Attribute Coding," 128. MPEG Meeting, Oct. 7, 2019-Oct. 11, 2019, Geneva, (Motion Picture Expert Group or ISO/IEC JTC1/SC29/WG11), No. M51160, Oct. 10, 2019, XP030221619, 9 Pages.

\* cited by examiner

INTER-COMPONENT RESIDUAL PREDICTION FOR COLOR ATTRIBUTES IN GEOMETRY POINT CLOUD COMPRESSION CODING

This application claims the benefit of U.S. Provisional Patent Application 63/088,345, filed 6 Oct. 2020, the entire content of which is incorporated herein by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

According to some techniques, to improve coding-efficiency, G-PCC encoders and decoders may be configured to predict color values (e.g., RGB values) for points from the color values of already-coded neighboring points and signal, from encoder to decoder, difference values between the predicted color values and the actual color values. For some color components (e.g., G), the encoder and decoder may be configured to determine an initial prediction value based on an already-coded neighboring point and additionally predict the residual value based on the already-coded residual value of another component (e.g., R or B). Thus, instead of signaling the full difference between the initial prediction of the color value and the actual color value, the G-PCC encoder only needs to signal to the G-PCC decoder the remaining difference between the actual color value and the initial prediction value plus the predicted residual value. As this remaining residual value may typically be a smaller number than the full residual value, the remaining residual value may be signaled with fewer bits than the full residual value. This use of prediction and residual values may reduce the bits needed to signal color values when compared to signaling color values directly.

This disclosure describes techniques for determining the predicted residual value. G-PCC encoders and G-PCC decoders implementing the techniques of this disclosure may be able to generate more accurate predicted residual values, making the remaining residual values smaller when compared to the remaining residual values determined by existing residual prediction techniques. As smaller values can typically be coded using fewer bits, by making remaining residual values smaller, the techniques of this disclosure may reduce the overall number of bits needed to signal attribute values.

According to one example, a device for decoding encoded point cloud data includes a memory configured to store the encoded point cloud data; and one or more processors, implemented in circuitry, and configured to: for a point of a point cloud, determine a first color value for a first color component based on a first predicted value and a first residual value; apply a scaling factor to the first residual value to determine a predicted second residual value, wherein the scaling factor has one or both of a non-integer value or an absolute value greater than one; for the point of the point cloud, receive a second residual value in the encoded point cloud data; determine a final second residual value based on the predicted second residual value and the received second residual value; and for the point of the point cloud, determine a second color value for a second color component based on a second predicted value and the final second residual value.

According to another example, a method of decoding encoded point cloud data includes, for a point of a point cloud, determining a first color value for a first color component based on a first predicted value and a first residual value; applying a scaling factor to the first residual value to determine a predicted second residual value, wherein the scaling factor has one or both of a non-integer value or an absolute value greater than one; for the point of the point cloud, receiving a second residual value in the encoded point cloud data; determining a final second residual value based on the predicted second residual value and the received second residual value; and for the point of the point cloud, determining a second color value for a second color component based on a second predicted value and the final second residual value.

According to another example, a computer-readable storage medium stores instructions that when executed by one or more processors cause the one or more processors to: for a point of a point cloud, determine a first color value for a first color component based on a first predicted value and a first residual value; apply a scaling factor to the first residual value to determine a predicted second residual value, wherein the scaling factor has one or both of a non-integer value or an absolute value greater than one; for the point of the point cloud, receive a second residual value in the encoded point cloud data; determine a final second residual value based on the predicted second residual value and the received second residual value; and for the point of the point cloud, determine a second color value for a second color component based on a second predicted value and the final second residual value.

According to another example, a device for encoding point cloud data includes a memory configured to store the encoded point cloud data; and one or more processors, implemented in circuitry, and configured to: for a point of a point cloud, determine a first color value for a first color component; encode the first color value for the first color component as a first predicted value and a first residual value; for the point of the point cloud, determine a second color value for a second color component; determine a second predicted value for the second color value for the second color component; determine a second residual value for the second color value for the second color component; apply a scaling factor to the first residual value to determine a predicted second residual value, wherein the scaling factor has one or both of a non-integer value or an absolute value greater than one; and generate, for inclusion in the point cloud data, a syntax element representing a difference between the second residual value and the predicted second residual value.

The details of one or more examples are set forth in the accompanying drawings and the description below. Other features, objects, and advantages will be apparent from the description, drawings, and claims.

DETAILED DESCRIPTION

Figure 1:
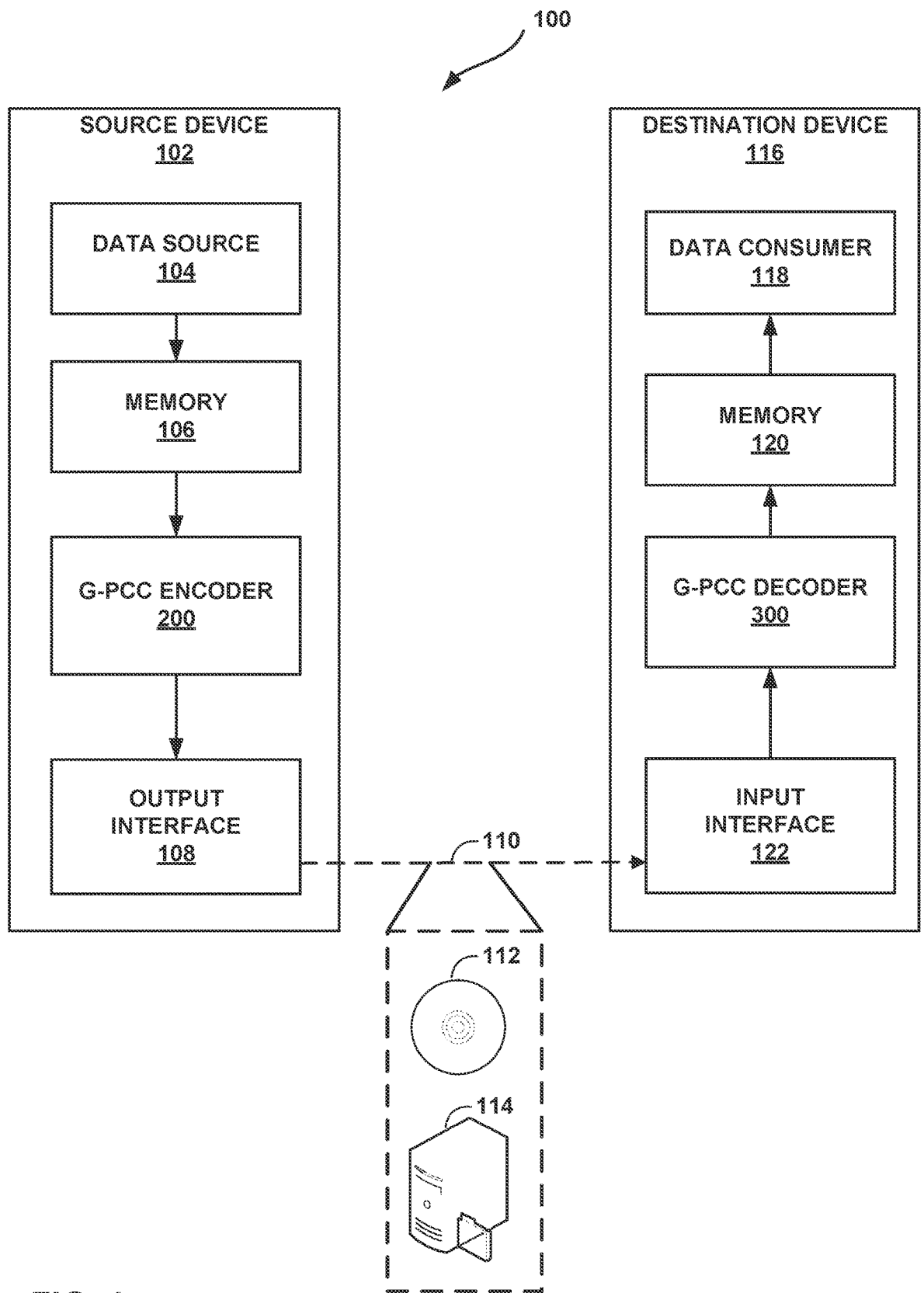
FIG. 1 is a block diagram illustrating an example encoding and decoding system that may perform the techniques of this disclosure.

"Geometry-based point cloud compression" (G-PCC) directly compresses 3D geometry i.e., the positions of a set of points in a 3D space. G-PCC also compresses associated attribute values, such as color values, for each point associated with the 3D geometry.

A point cloud contains a set of points in a 3D space and may have attributes associated with the points. The attributes may, for example, be color information such as R/G/B, Y/Cb/Cr, reflectance information, or other attributes such as temperature values, humidity values, latitude coordinates, longitude coordinates, and the like. Point clouds may be captured by a variety of cameras or sensors such as light detection and ranging (LIDAR) scanners or 3D scanners and may also be computer-generated. Point cloud data can be used in a variety of applications including, but not limited to, construction (e.g., modeling), graphics (e.g., 3D models for visualizing and animation), and the automotive industry (e.g., LIDAR sensors used to help in navigation).

The 3D space occupied by point cloud data may be enclosed by a virtual bounding box. The positions of the points in the bounding box may be represented by a certain precision. Thus, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles, and each tile may be coded into one or more slices. The partitioning of the bounding box into slices and tiles may be based on a number of points in each partition, or based on other considerations (e.g., a particular region may be coded as tiles). The slice regions may be further partitioned using splitting decisions similar to those in video codecs.

According to some techniques, to improve coding-efficiency, G-PCC encoders and decoders may be configured to predict color values (e.g., RGB values) for points from the color values of already-coded neighboring points and signal, from encoder to decoder, difference values between the predicted color values and the actual color values. For some color components (e.g., G), the encoder and decoder may be configured to determine an initial prediction value based on an already-coded neighboring point and additionally predict the residual value based on the already-coded residual value of another component (e.g., R or B). Thus, instead of signaling the full difference between the initial prediction of the color value and the actual color value, the G-PCC encoder only needs to signal to the G-PCC decoder the remaining difference between the actual color value and the initial prediction value plus the predicted residual value. As this remaining residual value may typically be a smaller number than the full residual value, the remaining residual value may be signaled with fewer bits than the full residual value. This use of prediction and residual values may reduce the bits needed to signal color values when compared to signaling color values directly.

An example technique for signaling residual values will now be described. In this example, Res_R, Res_G, and Res_B represent the residual values of the R, G. and B color components, respectively. It can be observed that the R, G, and B residual values may be approximated by the following relationship:

$$Res\_B \approx Res\_G$$

$$Res\_R \approx Res\_G$$

For the coding of Res_B and Res_R, the encoder and decoder may perform a further prediction from Res_G, and thus only the remaining residual value needs to be included in the point cloud data. From the decoder perspective, if ResR, ResG, and ResB are the residual samples reconstructed from the bitstream for R. G. and B, respectively, then the final R residual can be determined as Res'R=ResR+ResG and the final B residual can be determined as Res'B=ResB+ResG, with Res'R and Res'B representing the final R residual value and final B residual value, respectively.

Although the above-described technique exploits the correlation (positive or negative) between two color components, i.e., two channels, this technique does not exploit the fact that the residual energy of the two color components may in some coding scenarios be different.

This disclosure describes techniques for utilizing scaling values, Sb and Sr, such that G-PCC decoder 300 can be configured to determine a final B residual and a final R residual as follows:

$$Res'B = ResB + Sb*ResG$$

$$Res'R = ResR + Sr*ResG$$

This disclosure also describes techniques for signaling these values of Sb and Sr. For example, for p=1/4, the possible values of Sb and Sr may be k*p=k/4, where k is an integer. The value of p can be fixed, predetermined, or signaled. In some examples, Sb and Sr values may have a range of [−a, +a] with an accuracy of p. For example, for a=2, and p=1/4, the scaling factor values are s: {−2, −7/4, −6/4, −5/4, −1, −3/4, −2/4, −1/4, 0, 1/4, 2/4, 3/4, 1, 5/4, 6/4, 7/4, 2}. The values of a and p can be fixed, predetermined, signaled, or any combination thereof. As will be explained in more detail below, the scaling factor values of Sb and Sr can also be implemented as a combination of a multiplication operation and a bit shift operation to potentially avoid floating point operations, and thus reduce computational complexity.

As one example, assume that a point of a point cloud has color values of (R, G, B)=(81, 100, 82). A G-PCC decoder may predict, from previously coded points predicted color values of (predR, predG, predB)=(76, 96, 75). Thus, the residual values, meaning the differences between the actual color values for the point and the predicted color values for the point, are (resR, resG, resB)=(5, 4, 7). Thus, a G-PCC encoder may include in the point cloud a value of 4 for resG. For resB, however, the G-PCC encoder may include in the point cloud a value equal to 7−Sb*resG. If Sb can only equal 1, then the G-PCC encoder includes in the point cloud data a value of 3 (3=7−4). Utilizing the techniques of this disclosure, however, a G-PCC encoder may, for example, be able to include in the point cloud data a value of 0 instead of 3 (0=7−Sb*4, with Sb equal to 7/4). As 0 is less than 3, the G-PCC encoder may be able to code a value of 0 using fewer bits than a value of 3. The G-PCC encoder may encode resR, using a scaling value of Sr, in a similar manner.

Thus, by determining a scaling factor that has one or both of a non-integer value or an absolute value greater than one, G-PCC encoders and G-PCC decoders may be able to generate more accurate predicted residual values, making the remaining residual values smaller when compared to the remaining residual values determined by existing residual prediction techniques. As smaller values can typically be coded using fewer bits, by making remaining residual values smaller, the techniques of this disclosure may reduce the overall number of bits needed to signal attribute values.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to coding of components of color attributes in G-PCC. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to coding of a last component of color attributes in G-PCC. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames" of the data to G-PCC encoder 200, which encodes data for the frames. Data source 104 of source device 102 may include a point cloud capture device, such as any of a variety of cameras or sensors, e.g., a 3D scanner or a LIDAR device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of point clouds to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC1/SC29/WG11 w19088, Brussels, Belgium, January 2020, and a description of the codec is available in G-PCC Codec Description v6, ISO/IEC JTC1/SC29/WG11 w19091, Brussels, Belgium. January 2020.

A point cloud contains a set of points in a 3D space, and may have attributes associated with the points. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
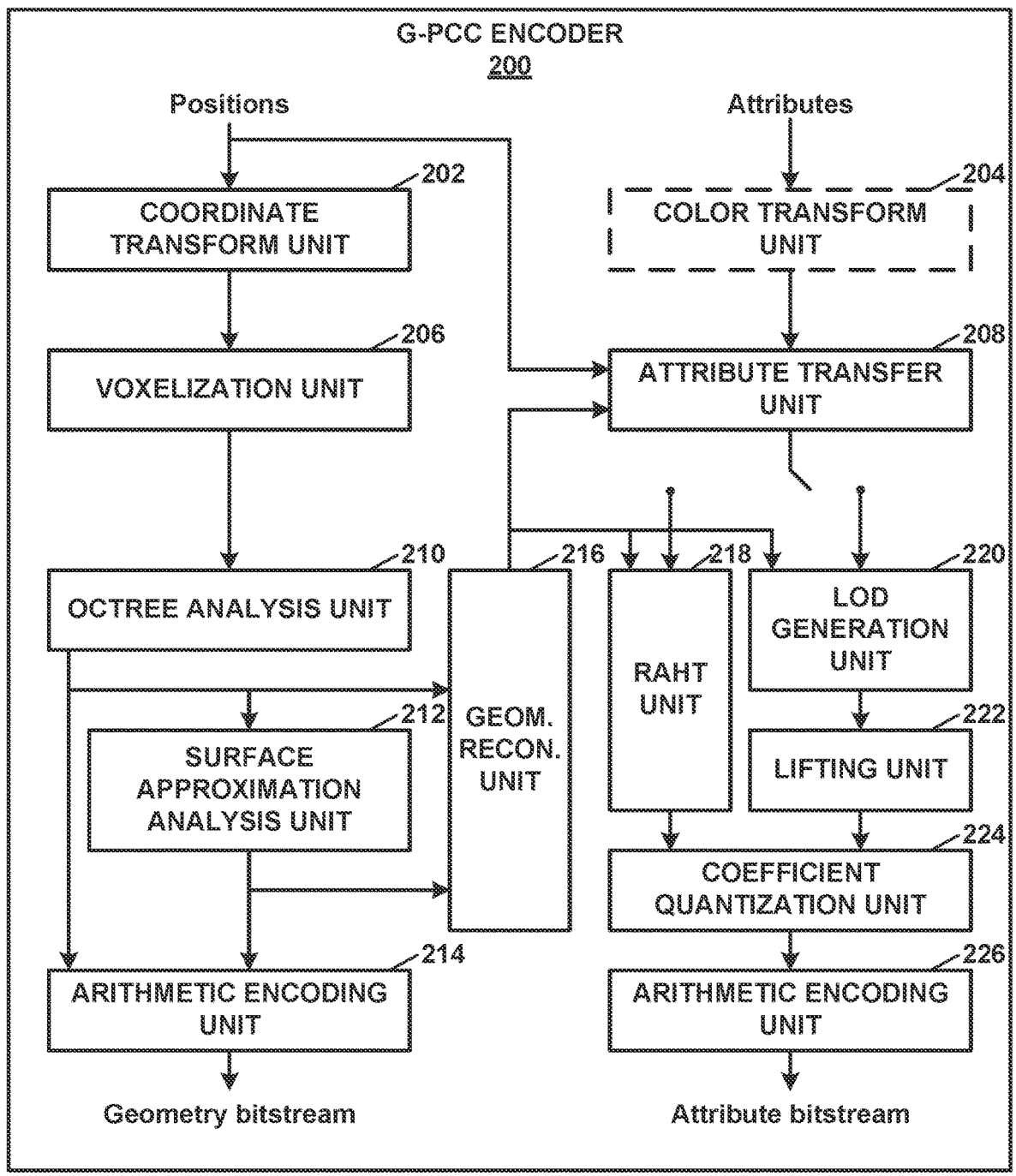
FIG. 2 is a block diagram illustrating an example Geometry Point Cloud Compression (G-PCC) encoder.
Figure 3:
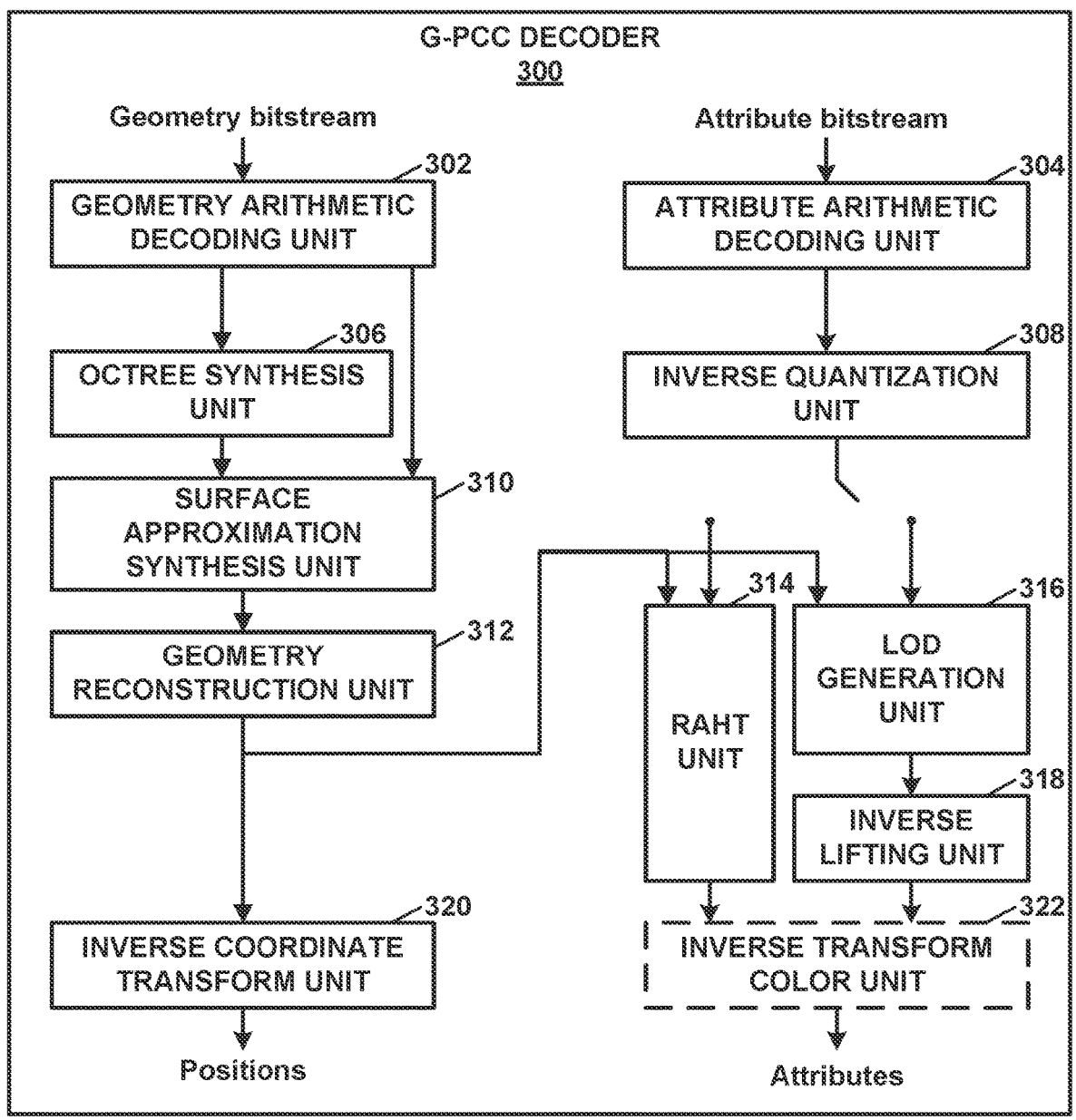
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, surface approximation analysis units 212 and 310 and RAHT units 218 and 314 represent options typically used for Category 1 data, while LOD generation units 220 and 316, lifting unit 222, and inverse lifting unit 318 represent options typically used for Category 3 data. All the other units may be common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model (known as Trisoup coding). The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding processes in G-PCC: Region Adaptive Hierarchical Transform (RAHT) coding, interpolation-based hierarchical nearest-neighbor prediction (Predicting Transform), and interpolation-based hierarchical nearest-neighbor prediction with an update/lifting step (Lifting Transform). RAHT and Lifting are typically used for Category 1 data, while predicting is typically used for Category 3 data. However, either process may be used for any data, and, just like with the geometry codecs in G-PCC, the attribute coding process used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance. Level of detail generation partitions a set of input points into a series of detail levels and associated refinement layers. A level of detail is a set of points that represents a subsampled version of the slice geometry. The zero-th level of detail is the full resolution slice geometry.

At G-PCC encoder 200, the residuals obtained as the output of the coding process for the attributes are quantized. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may receive a set of positions and a set of attributes. The positions may include coordinates of points in a point cloud. The attributes may include information about points in the point cloud, such as colors associated with points in the point cloud.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space. The techniques for inter-component residual prediction described herein may be performed in the RGB color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in a geometry bitstream.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. Alternatively or additionally, LOD generation unit 220 and lifting unit 222 may apply LOD processing and lifting, respectively, to the attributes of the reconstructed points. RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in an attribute bitstream.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322.

G-PCC decoder 300 may obtain a geometry bitstream and an attribute bitstream. Geometry arithmetic decoding unit 302 of G-PCC decoder 300 may apply arithmetic decoding (e.g., Context-Adaptive Binary Arithmetic Coding (CABAC) or other type of arithmetic decoding) to syntax elements in the geometry bitstream. Similarly, attribute arithmetic decoding unit 304 may apply arithmetic decoding to syntax elements in the attribute bitstream.

Octree synthesis unit 306 may synthesize an octree based on syntax elements parsed from the geometry bitstream. In instances where surface approximation is used in the geometry bitstream, surface approximation synthesis unit 310 may determine a surface model based on syntax elements parsed from the geometry bitstream and based on the octree.

Furthermore, geometry reconstruction unit 312 may perform a reconstruction to determine coordinates of points in a point cloud. Inverse transform coordinate unit 320 may apply an inverse transform to the reconstructed coordinates to convert the reconstructed coordinates (positions) of the points in the point cloud from a transform domain back into an initial domain.

Additionally, in the example of FIG. 3, inverse quantization unit 308 may inverse quantize attribute values. The attribute values may be based on syntax elements obtained from the attribute bitstream (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. In some examples, LOD generation unit 316 and inverse lifting unit 318 may determine color values for points of the point cloud using a level of detail-based technique.

Furthermore, in the example of FIG. 3, inverse transform color unit 322 may apply an inverse color transform to the color values. The inverse color transform may be an inverse of a color transform applied by color transform unit 204 of G-PCC encoder 200. For example, color transform unit 204 may transform color information from an RGB color space to a YCbCr color space. Accordingly, inverse color transform unit 322 may transform color information from the YCbCr color space to the RGB color space. The techniques for inter-component residual prediction described herein may be performed in the RGB color space, meaning that this inverse color transform may be skipped.

The various units of FIG. 2 and FIG. 3 are illustrated to assist with understanding the operations performed by G-PCC encoder 200 and G-PCC decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

In accordance with the techniques of this disclosure, G-PCC encoder 200 and G-PCC decoder 300 may be configured to perform cross component residual prediction for predicting transform. For the coding of RGB content (typically with a coding order of G, followed by B and then R), a correlation typically exists between the (dequantized) residual of different color components. To improve coding efficiency, G-PCC decoder 300 may be configured to predict the residual of the B and R channels from the residual of the G channel.

From the perspective of G-PCC decoder 300, ResX (where X denotes a channel which can be G, B or R) represents the reconstructed samples from the bitstream for channel X. In TMC-v11, G-PCC decoder 300 determines the final residual of the B and R channels, i.e., Res'B and Res'R, as follows:

$$Res'B=ResB+ResG$$

$$Res'R=ResR+ResG$$

Cross component residual prediction may be enabled and disabled by a flag (aps.inter_component_prediction_enabled_flag) that is included in an attribute parameter set (APS).

Although current techniques for cross component residual prediction exploit the correlation between two channels, current techniques employ a fixed correlation of +1 that does not exploit the fact that the difference of the residual energy of two components may be different.

This disclosure describes techniques that may improve cross component residual prediction by exploiting the difference of the residual energy of two components. The techniques described herein can be employed independently or may be implemented in a combined way.

According to one example technique of this disclosure, G-PCC encoder 200 and G-PCC decoder 300 may code generic scaling values of Sb and Sr per LoD, which may then be used to scale value of ResG for performing the residual prediction. Thus, G-PCC decoder 300 may determine the final residual of the B and R channels, i.e., Res'B and Res'R, as follows:

$$Res'B=ResB+Sb*ResG$$

$$Res'R=ResR+Sr*ResG$$

According to another example technique of this disclosure, G-PCC encoder 200 and G-PCC decoder 300 may be configured to code more diversified values for Sb and Sr per LoD, where Sb and Sr could be any value with an (fractional) accuracy of p1 and p2, respectively. For example, for p1=p2=1/4(=p), the possible values of Sb and Sr are respectively kb*p=kb/4, and kr*p=kr/4 where kb and kr are integers. The values of p1 and p2 may be fixed, predetermined, or signaled. The techniques of this disclosure will be described, for simplicity, using a common accuracy, referred to as p=(p1=p2), but these techniques may be also extended to account for different accuracies per component. That is, in some implementations, p1 may not equal p2, and the available scaling values for signalling ResB and ResR may be different.

According to another example technique of this disclosure, G-PCC encoder 200 and G-PCC decoder 300 may be configured to utilize Sb and Sr values that have a range of [−a, +a] with respective accuracy. For example, the accuracy can be represented as p. Thus, for a=2 and p=1/4, the available scaling factor values are: {−2, −7/4, −6/4, −5/4, −1, −3/4, −2/4, −1/4, 0, 1/4, 2/4, 3/4, 1, 5/4, 6/4, 7/4, 2}. The values of a and p may be fixed, predetermined, or signaled.

In some examples of this disclosure, the accuracy p can be represented as a power of 2, i.e., $p=1/2^b$, such that the division associated with Sb and Sr may be represented by a right shift:

$$Res'B=ResB+(kb*ResG>>b)$$

$$Res'R=ResR+(kr*ResG>>b).$$

The value kx (x=B, R) is a scaled version of Sx, e.g., kx=Sx<<<b (equivalent of Sx=Kx*p). Alternatively, a rounding term may be incorporated for the prediction; accordingly, the residual derivation may be:

$$Res'B=ResB+((kb*ResG+1<<(b-1))>>b)$$

$$Res'R=ResR+((kr*ResG+1<<(b-1))>>b).$$

According to another example technique of this disclosure, G-PCC encoder 200 and G-PCC decoder 300 may be configured to directly code the signaling of kx (x=b,r) per LoD level (kx[lod]) by first coding the absolute value of kx[lod], followed by the sign if applicable (if kx[lod] is not equal to zero). For the magnitude coding, either a fixed length code, with the length being predetermined, fixed, or signaled, or a variable length code may be used. The resulting signs are often correlated in the neighboring LoDs, so G-PCC encoder 200 and G-PCC decoder 300 may be configured to code signs with a dedicated context.

As the k values for different LoDs are frequently correlated, according to another example technique of this disclosure, G-PCC encoder 200 and G-PCC decoder 300 may be configured to predict kx[lod] from kx[lod−1], if applicable, and code the difference (kx[lod]−kx[lod−1]) instead. The magnitude and the sign may be coded separately.

According to another example technique of this disclosure, G-PCC encoder 200 and G-PCC decoder 300 may be configured to signal the value of kx in an attribute data unit header or an attribute slice header. In this case, k values, whether directly coded or difference coded, may be coded with se(v), meaning the values may be coded as a signed integer 0-th order Exp-Golomb-coded syntax element with the left bit first.

The parsing of kx values uses the information of the number of LoD's. In G-PCC, the maximum number of LoD's (LoD1) is signaled in an APS. However, the actual number of LoDs (LoD2) can only be derived after LoD reconstruction and may be smaller than LoD1 in some cases. That is, some slices may have points so sparsely arranged or with so few points that not all LoDs can be generated. For instance, in an example coding scenario. LoD1 may equal 12, and LoD2 may equal 10. To avoid the parsing dependency associated with LoD reconstruction, according to another example technique of this disclosure, G-PCC encoder 200 and G-PCC decoder 300 may be configured to code, for example, always code, LoD1 scale values instead of LoD2 values, whereas the last (LoD1−LoD2) values may be signaled as zeros, as such values need not be used for the decoding processes for attribute reconstruction.

According to another example technique of this disclosure, G-PCC encoder 200 and G-PCC decoder 300 may be configured to code kx values at a slice level, rather than at the LoD level, which may simplify the decoding process and also reduce signaling overhead.

According to another example technique of this disclosure, G-PCC encoder 200 and G-PCC decoder 300 may be configured to apply this coding tool to a generic multi-dimensional attribute, where for an N-dimensional attribute with one first (primary) component and other (N−1) secondary components, (N−1) different scaling values can be signaled for each (N−1) secondary component specifying the respective scaling applied to the primary component prior to performing residual prediction.

In accordance with the techniques described above, G-PCC decoder 300 represents an example of a device for processing a point cloud that may be configured to receive point cloud data representing a point cloud; determine residual values for a first component of the point cloud data; and predict residual values for a second component of the point cloud data based on the residual values for the first component.

In accordance with the techniques described above, G-PCC encoder 200 represents an example of a device for processing a point cloud that may be configured to obtain point cloud data representing a point cloud; determine residual values for a first component of the point cloud data; determine residual values for a second component of the point cloud data; and signal the residual values for the second component of the point cloud data based on the residual values for the first component.

In accordance with the techniques described above, G-PCC encoder 200 may be configured to determine, for a point of a point cloud, a first color value for a first color component, such as a G component, and encode the first color value for the first color component as a first predicted value and a first residual value. G-PCC encoder 200 may determine, for the point of the point cloud, a second color value for a second color component, such as a R or B component. G-PCC encoder 200 may determine a second predicted value for the second color value for the second color component. G-PCC encoder 200 may determine a second residual value, such as Res'B and Res'R above, for the second color value for the second color component. G-PCC encoder 200 may apply a scaling factor that has one or both of a non-integer value or an absolute value greater than one to the first residual value to determine a predicted second residual value. The scaling factor may, for example, be applied by a multiplication by a scalar value, such as k above, and by a bit shift operation, such as >>b described above. G-PCC encoder 200 may generate, for inclusion in the point cloud data, a syntax element representing a difference between the second residual value and the predicted second residual value. This difference may, for example, correspond to ResB or ResR described above.

In accordance with the techniques described above, G-PCC decoder 300 may be configured to determine, for a point of a point cloud, a first color value for a first color component based on a first predicted value and a first residual value. The first color component may, for example, be a green component and the first residual value may correspond to ResG described above. G-PCC decoder 300 may apply a scaling factor that has one or both of a non-integer value or an absolute value greater than one to the first residual value to determine a predicted second residual value. The scaling factor may, for example, be applied by a multiplication by a scalar value, such as k above, and by a bit shift operation, such as >>b described above. For the point of the point cloud, G-PCC decoder 300 may receive in the encoded point cloud data a second residual value, such as ResR or ResB described above, and determine a final second residual value (e.g., Res'R and Res'B described above) based on the predicted second residual value and the received second residual value. Based on a second predicted value and the final second residual value, G-PCC decoder 300 may determine a second color value for a second color component, such as a red or blue component.

Figure 4:
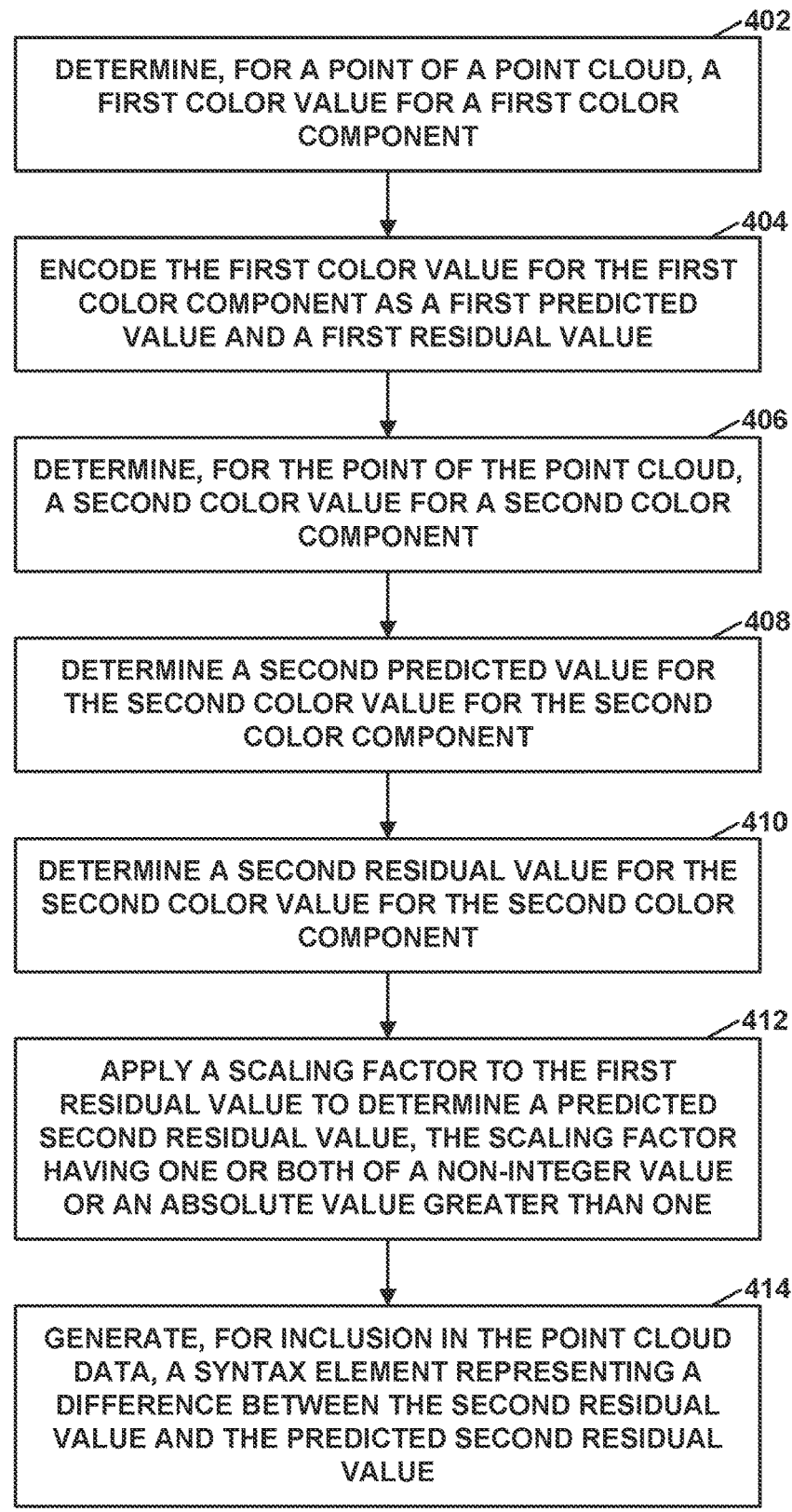
FIG. 4 is a flowchart illustrating an example operation of a G-PCC encoder in accordance with one or more techniques of this disclosure.

FIG. 4 is a flowchart illustrating an example operation of G-PCC encoder 200 in accordance with one or more techniques of this disclosure. G-PCC encoder 200 determines, for a point of a point cloud, a first color value for a first color component (402). G-PCC encoder 200 encodes the first color value for the first color component as a first predicted value and a first residual value (404). The first color component may, for example, be a green component.

G-PCC encoder 200 determines, for the point of the point cloud, a second color value for a second color component (406). The second color component may, for example, be a red component or a blue component.

G-PCC encoder 200 determines a second predicted value for the second color value for the second color component (408). G-PCC encoder 200 may, for example, determine the second predicted value for the point of the point cloud based on a value for a different point, such as a neighboring point, of the point cloud. G-PCC encoder 200 determines a second residual value for the second color value for the second color component (410). The second residual value may, for example, be a difference between the second color value and the second predicted value.

In this example, G-PCC encoder 200 applies a scaling factor to the first residual value to determine a predicted second residual value, the scaling factor having one or both of a non-integer value or an absolute value greater than one (412). G-PCC encoder 200 may, for example, determine and generate, for inclusion in the point cloud data, a scalar value that is an integer value. To generate the scalar value, G-PCC encoder 200 may generate a difference value corresponding to a difference between the scalar value and a previously determined scalar value and include in the point cloud data, a variable length syntax element indicating the difference value. The previously determined scalar value may, for example, be a scalar value for a different level of detail than the level of detail for the point cloud. G-PCC encoder 200 may include the scalar value in a syntax structure such as an attribute slice header. To apply the scaling factor, G-PCC encoder 200 may perform a multiplication by the scalar value and perform a bit shift operation, such as a right shift by 2.

G-PCC encoder 200 generates, for inclusion in the point cloud data, a syntax element representing a difference between the second residual value and the predicted second residual value (414).

Figure 5:
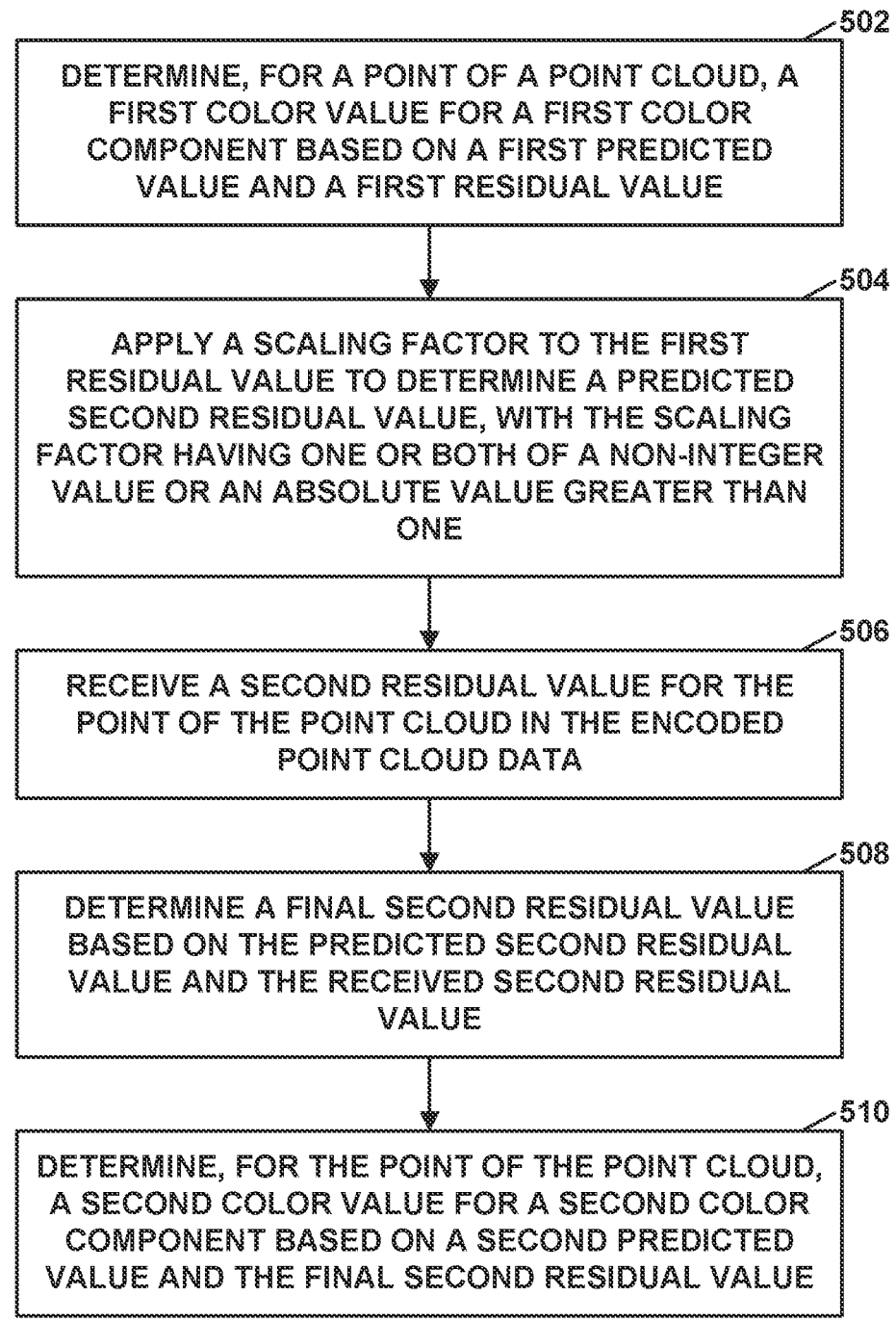
FIG. 5 is a flowchart illustrating an example operation of a G-PCC decoder in accordance with one or more techniques of this disclosure.

FIG. 5 is a flowchart illustrating an example operation of G-PCC decoder 300 in accordance with one or more techniques of this disclosure. In the example of FIG. 5, G-PCC decoder 300 determines, for a point of a point cloud, a first color value for a first color component based on a first predicted value and a first residual value (502). The first color component may, for example, be a green color component.

G-PCC decoder 300 applies a scaling factor to the first residual value to determine a predicted second residual value, with the scaling factor having one or both of a non-integer value or an absolute value greater than one (504). G-PCC decoder 300 may, for example, receive, in the point cloud data, as part of a syntax structure such as an attribute slice header, a scalar value that is an integer value and apply the scaling factor by performing a multiplication by the scalar value and performing a bit shift operation. The bit shift operation may, for example, be a right shift by 2 operation. G-PCC decoder 300 may, for example, receive a variable length syntax element indicating a difference value corresponding to a difference between the scalar value and a previously received scalar value from a different level of detail than the level of detail that includes the point cloud.

In this example, G-PCC decoder 300 receives a second residual value for the point of the point cloud in the encoded point cloud data (506) and determines a final second residual value based on the predicted second residual value and the received second residual value (508). The final second residual value may, for example, be the sum of the received second residual value and the predicted second residual value.

G-PCC decoder 300 determines, for the point of the point cloud, a second color value for a second color component based on a second predicted value and the final second residual value (510). G-PCC decoder 300 may, for example, determine the second predicted value for the point of the point cloud based on a value for a different point of the point cloud. The second color component may, for example, be a red or a blue color component.

Figure 6:
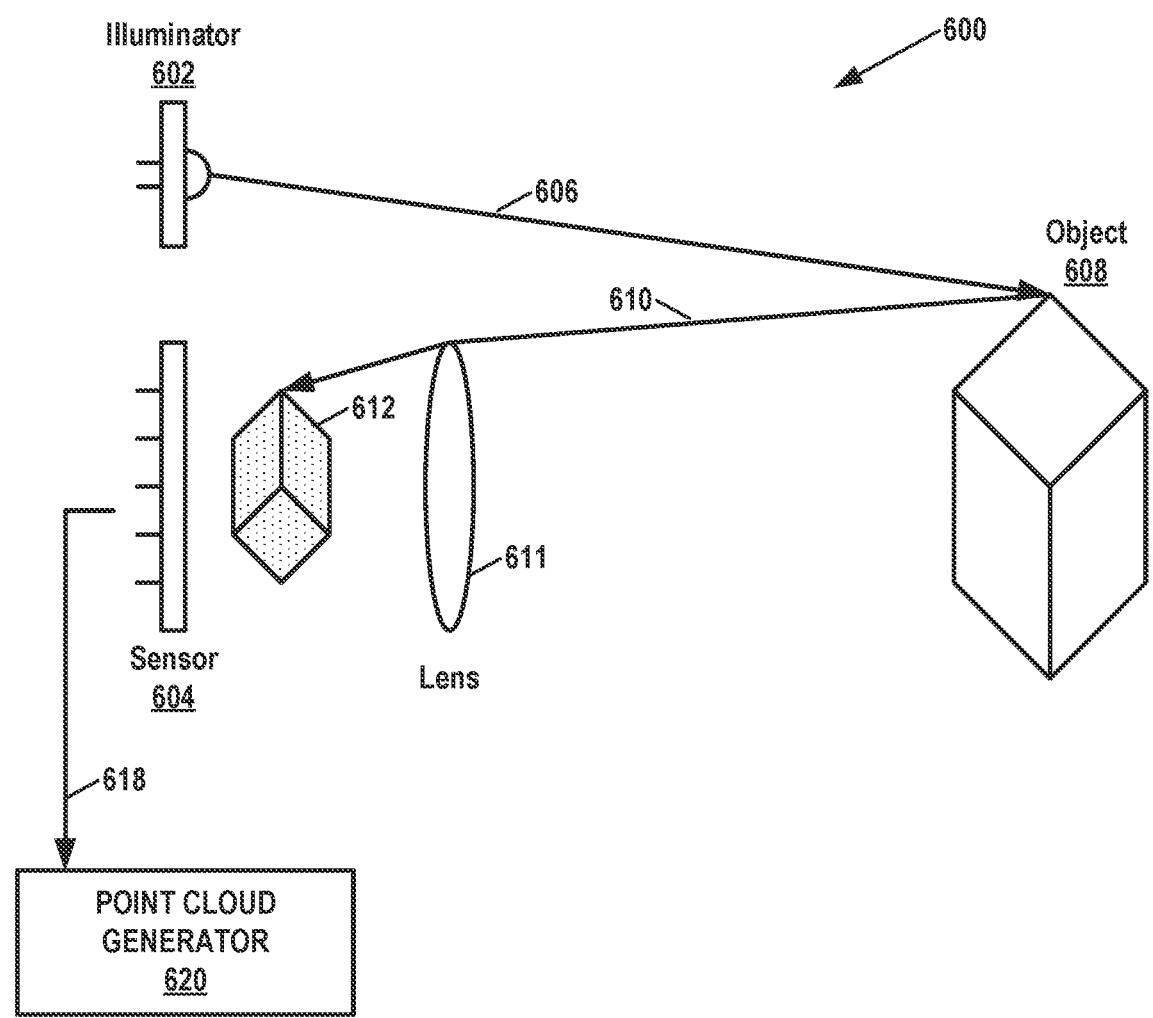
FIG. 6 is a conceptual diagram illustrating an example range-finding system that may be used with one or more techniques of this disclosure.

FIG. 6 is a conceptual diagram illustrating an example range-finding system 600 that may be used with one or more techniques of this disclosure. In the example of FIG. 6, range-finding system 600 includes an illuminator 602 and a sensor 604. Illuminator 602 may emit light 606. In some examples, illuminator 602 may emit light 606 as one or more laser beams. Light 606 may be in one or more wavelengths, such as an infrared wavelength or a visible light wavelength. In other examples, light 606 is not coherent, laser light. When light 606 encounters an object, such as object 608, light 606 creates returning light 610. Returning light 610 may include backscattered and/or reflected light. Returning light 610 may pass through a lens 611 that directs returning light 610 to create an image 612 of object 608 on sensor 604. Sensor 604 generates signals 618 based on image 612. Image 612 may comprise a set of points (e.g., as represented by dots in image 612 of FIG. 6).

In some examples, illuminator 602 and sensor 604 may be mounted on a spinning structure so that illuminator 602 and sensor 604 capture a 360-degree view of an environment. In other examples, range-finding system 600 may include one or more optical components (e.g., mirrors, collimators, diffraction gratings, etc.) that enable illuminator 602 and sensor 604 to detect objects within a specific range (e.g., up to 360-degrees). Although the example of FIG. 6 only shows a single illuminator 602 and sensor 604, range-finding system 600 may include multiple sets of illuminators and sensors.

In some examples, illuminator 602 generates a structured light pattern. In such examples, range-finding system 600 may include multiple sensors 604 upon which respective images of the structured light pattern are formed. Range-finding system 600 may use disparities between the images of the structured light pattern to determine a distance to an object 608 from which the structured light pattern backscatters. Structured light-based range-finding systems may have a high level of accuracy (e.g., accuracy in the sub-millimeter range), when object 608 is relatively close to sensor 604 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 600 is a time of flight (ToF)-based system. In some examples where range-finding system 600 is a ToF-based system, illuminator 602 generates pulses of light. In other words, illuminator 602 may modulate the amplitude of emitted light 606. In such examples, sensor 604 detects returning light 610 from the pulses of light 606 generated by illuminator 602. Range-finding system 600 may then determine a distance to object 608 from which light 606 backscatters based on a delay between when light 606 was emitted and detected and the known speed of light in air). In some examples, rather than (or in addition to) modulating the amplitude of the emitted light 606, illuminator 602 may modulate the phase of the emitted light 606. In such examples, sensor 604 may detect the phase of returning light 610 from object 608 and determine distances to points on object 608 using the speed of light and based on time differences between when illuminator 602 generated light 606 at a specific phase and when sensor 604 detected returning light 610 at the specific phase.

In other examples, a point cloud may be generated without using illuminator 602. For instance, in some examples, sensor 604 of range-finding system 600 may include two or more optical cameras. In such examples, range-finding system 600 may use the optical cameras to capture stereo images of the environment, including object 608. Range-finding system 600 (e.g., point cloud generator 620) may then calculate the disparities between locations in the stereo images. Range-finding system 600 may then use the disparities to determine distances to the locations shown in the stereo images. From these distances, point cloud generator 620 may generate a point cloud.

Sensors 604 may also detect other attributes of object 608, such as color and reflectance information. In the example of FIG. 6, a point cloud generator 620 may generate a point cloud based on signals 618 generated by sensor 604. Range-finding system 600 and/or point cloud generator 620 may form part of data source 104 (FIG. 1).

Figure 7:
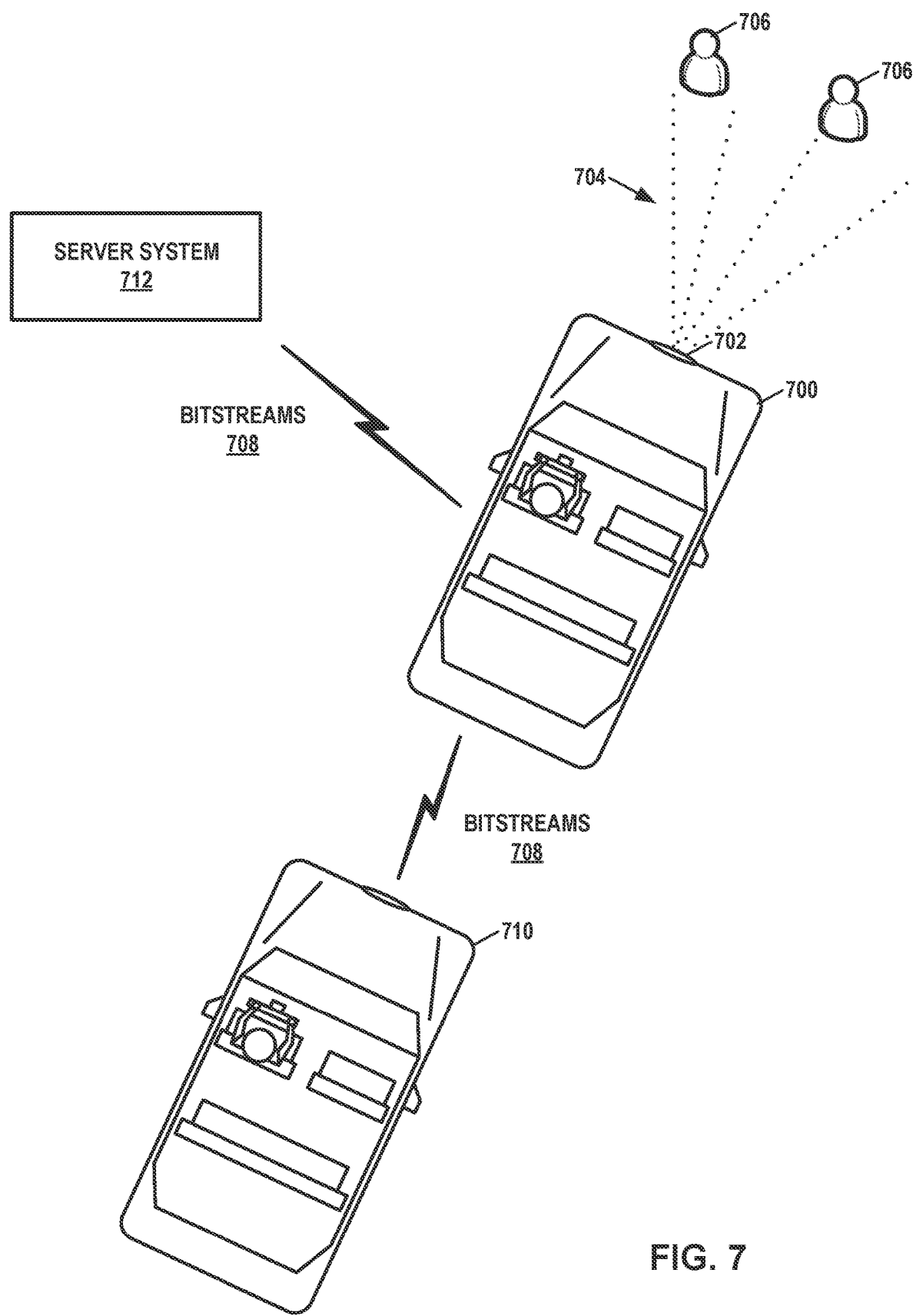
FIG. 7 is a conceptual diagram illustrating an example vehicle-based scenario in which one or more techniques of this disclosure may be used.

FIG. 7 is a conceptual diagram illustrating an example vehicle-based scenario in which one or more techniques of this disclosure may be used. In the example of FIG. 7, a vehicle 700 includes a laser package 702, such as a LIDAR system. Although not shown in the example of FIG. 7, vehicle 700 may also include a data source and a G-PCC encoder, such as G-PCC encoder 200 (FIG. 1). In the example of FIG. 7, laser package 702 emits laser beams 704 that reflect off pedestrians 706 or other objects in a roadway. The data source of vehicle 700 may generate a point cloud based on signals generated by laser package 702. The G-PCC encoder of vehicle 700 may encode the point cloud to generate bitstreams 708. Bitstreams 708 may include many fewer bits than the unencoded point cloud obtained by the G-PCC encoder. An output interface of vehicle 700 (e.g., output interface 108 (FIG. 1) may transmit bitstreams 708 to one or more other devices. Thus, vehicle 700 may be able to transmit bitstreams 708 to other devices more quickly than the unencoded point cloud data. Additionally, bitstreams 708 may require less data storage capacity.

In the example of FIG. 7, vehicle 700 may transmit bitstreams 708 to another vehicle 710. Vehicle 710 may include a G-PCC decoder, such as G-PCC decoder 300 (FIG. 1). The G-PCC decoder of vehicle 710 may decode bitstreams 708 to reconstruct the point cloud. Vehicle 710 may use the reconstructed point cloud for various purposes. For instance, vehicle 710 may determine based on the reconstructed point cloud that pedestrians 706 are in the roadway ahead of vehicle 700 and therefore start slowing down, e.g., even before a driver of vehicle 710 realizes that pedestrians 706 are in the roadway. Thus, in some examples, vehicle 710 may perform an autonomous navigation operation, generate a notification or warning, or perform another action based on the reconstructed point cloud.

Additionally or alternatively, vehicle 700 may transmit bitstreams 708 to a server system 712. Server system 712 may use bitstreams 708 for various purposes. For example, server system 712 may store bitstreams 708 for subsequent reconstruction of the point clouds. In this example, server system 712 may use the point clouds along with other data (e.g., vehicle telemetry data generated by vehicle 700) to train an autonomous driving system. In other example, server system 712 may store bitstreams 708 for subsequent reconstruction for forensic crash investigations (e.g., if vehicle 700 collides with pedestrians 706) or may transmit notifications or instructions for navigation to vehicle 700 or vehicle 710.

Figure 8:
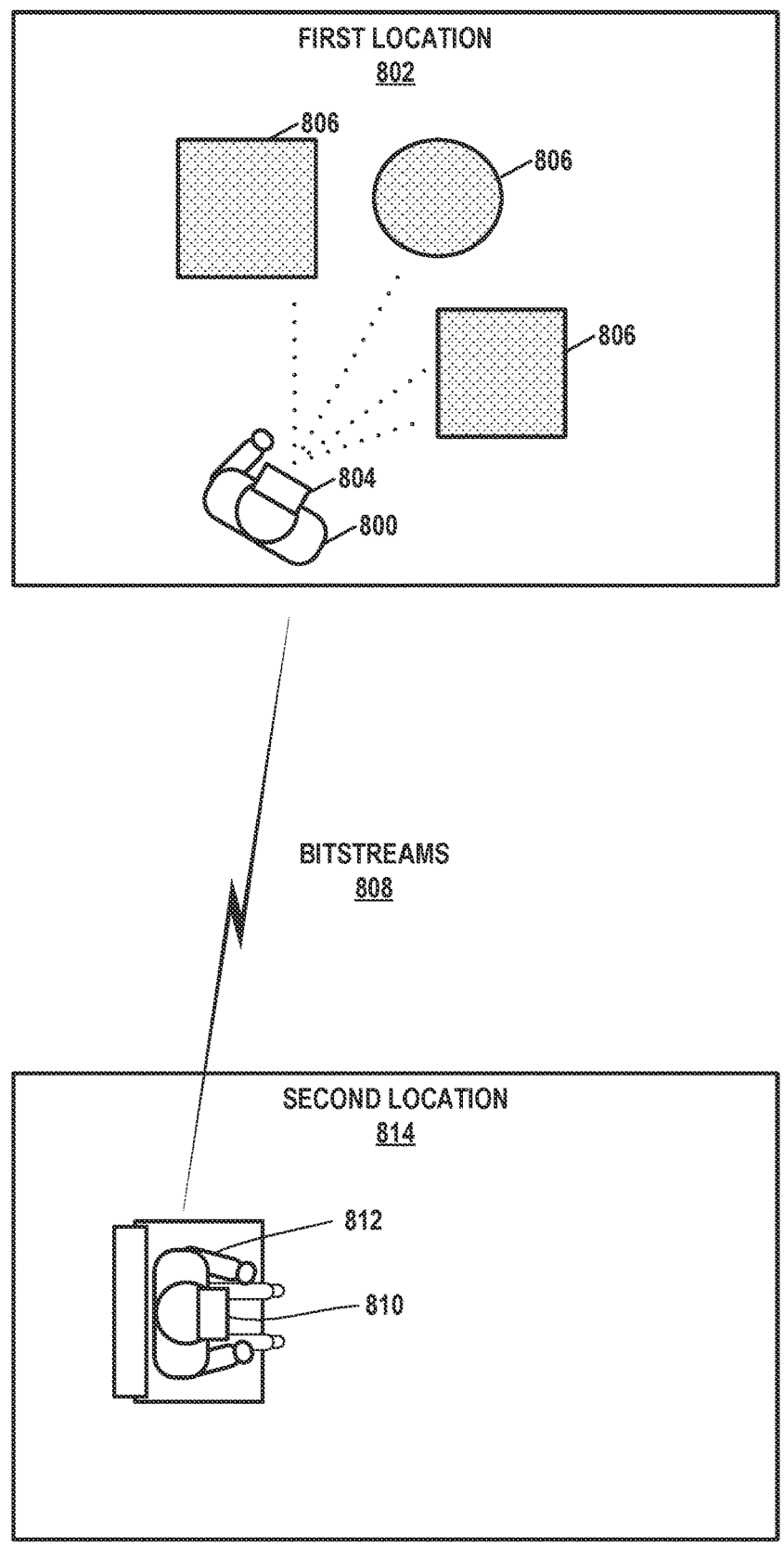
FIG. 8 is a conceptual diagram illustrating an example extended reality system in which one or more techniques of this disclosure may be used.

FIG. 8 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 8, a first user 800 is located in a first location 802. User 800 wears an XR headset 804. As an alternative to XR headset 804, user 800 may use a mobile device (e.g., mobile phone, tablet computer, etc.). XR headset 804 includes a depth detection sensor, such as a LIDAR system, that detects positions of points on objects 806 at first location 802. A data source of XR headset 804 may use the signals generated by the depth detection sensor to generate a point cloud representation of objects 806 at location 802. XR headset 804 may include a G-PCC encoder (e.g., G-PCC encoder 200 of FIG. 1) that is configured to encode the point cloud to generate bitstreams 808.

XR headset 804 may transmit bitstreams 808 (e.g., via a network such as the Internet) to an XR headset 810 worn by a user 812 at a second location 814. XR headset 810 may decode bitstreams 808 to reconstruct the point cloud. XR headset 810 may use the point cloud to generate an XR visualization (e.g., an AR, MR, VR visualization) representing objects 806 at location 802. Thus, in some examples, such as when XR headset 810 generates a VR visualization, user 812 at location 814 may have a 3D immersive experience of location 802. In some examples, XR headset 810 may determine a position of a virtual object based on the reconstructed point cloud. For instance, XR headset 810 may determine, based on the reconstructed point cloud, that an environment (e.g., location 802) includes a flat surface and then determine that a virtual object (e.g., a cartoon character) is to be positioned on the flat surface. XR headset 810 may generate an XR visualization in which the virtual object is at the determined position. For instance, XR headset 810 may show the cartoon character sitting on the flat surface.

Figure 9:
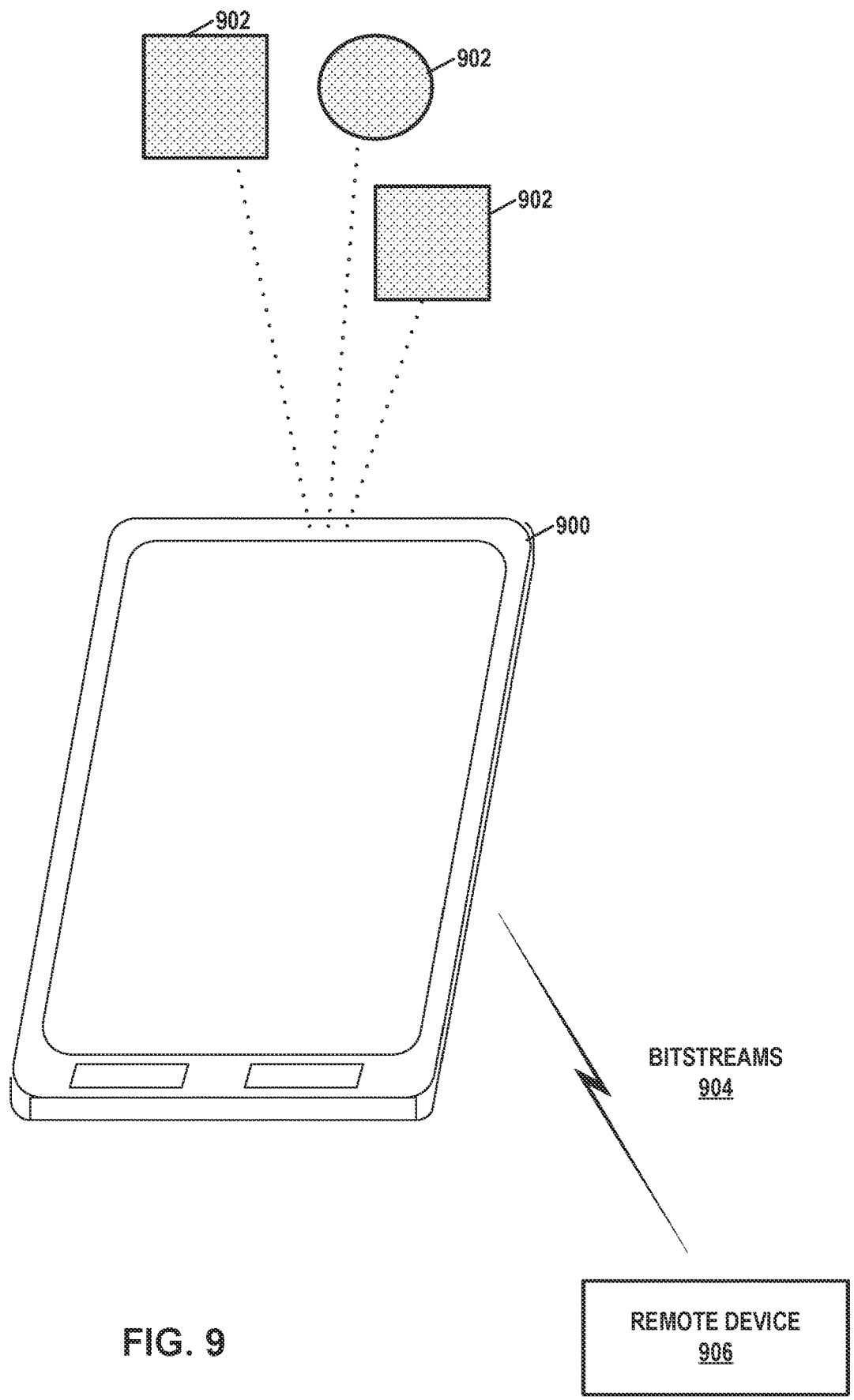
FIG. 9 is a conceptual diagram illustrating an example mobile device system in which one or more techniques of this disclosure may be used.

FIG. 9 is a conceptual diagram illustrating an example mobile device system in which one or more techniques of this disclosure may be used. In the example of FIG. 9, a mobile device 900, such as a mobile phone or tablet computer, includes a depth detection sensor, such as a LIDAR system, that detects positions of points on objects 902 in an environment of mobile device 900. A data source of mobile device 900 may use the signals generated by the depth detection sensor to generate a point cloud representation of objects 902. Mobile device 900 may include a G-PCC encoder (e.g., G-PCC encoder 200 of FIG. 1) that is configured to encode the point cloud to generate bitstreams 904. In the example of FIG. 9, mobile device 900 may transmit bitstreams to a remote device 906, such as a server system or other mobile device. Remote device 906 may decode bitstreams 904 to reconstruct the point cloud. Remote device 906 may use the point cloud for various purposes. For example, remote device 906 may use the point cloud to generate a map of environment of mobile device 900. For instance, remote device 906 may generate a map of an interior of a building based on the reconstructed point cloud. In another example, remote device 906 may generate imagery (e.g., computer graphics) based on the point cloud. For instance, remote device 906 may use points of the point cloud as vertices of polygons and use color attributes of the points as the basis for shading the polygons. In some examples, remote device 906 may perform facial recognition using the point cloud.

Examples in the various aspects of this disclosure may be used individually or in any combination.

The following numbered clauses illustrate one or more aspects of the devices and techniques described in this disclosure.

Clause 1A. A method of coding point cloud data, the method comprising: receiving point cloud data representing a point cloud; determining residual values for a first component of the point cloud data; and predicting residual values for a second component of the point cloud data based on the residual values for the first component.

Clause 2A. The method of clause 1A, wherein predicting the residual values for the second component of the point cloud data based on the residual values for the first component comprises determining difference values that correspond to differences between the residual values for the second component and the residual values for the first component.

Clause 3A. The method of clause 1A, wherein predicting the residual values for the second component of the point cloud data based on the residual values for the first component comprises: determining a scaling value; and determining difference values that correspond to differences between the residual values for the second component and scaled residual values for the first component.

Clause 4A. The method of any of clauses 1A-3A, wherein the point cloud data comprises RGB point cloud data, the first component comprises a G component of the RGB point cloud data, and the second component comprises a B component of the RGB point cloud data.

Clause 5A. The method of any of clauses 1A-3A, wherein the point cloud data comprises RGB point cloud data, the first component comprises a G component of the RGB point cloud data, and the second component comprises an R component of the RGB point cloud data.

Clause 6A. The method of any of clauses 1A-5A, further comprising generating a point cloud based on the first component of the point cloud data and the second component of the point cloud.

Clause 7A. A device for processing a point cloud, the device comprising one or more means for performing the method of any of clauses 1A-6A.

Clause 8A. The device of clause 7A, wherein the one or more means comprise one or more processors implemented in circuitry.

Clause 9A. The device of any of clauses 7A or 8A, further comprising a memory to store the data representing the point cloud.

Clause 10A. The device of any of clauses 7A-9A, wherein the device comprises a decoder.

Clause 11A. The device of any of clauses 7A-10A wherein the device comprises an encoder.

Clause 12A. The device of any of clauses 7A-11A, further comprising a device to generate the point cloud.

Clause 13A. The device of any of clauses 7-12, further comprising a display to present imagery based on the point cloud.

Clause 14A. A computer-readable storage medium having stored thereon instructions that, when executed, cause one or more processors to perform the method of any of clauses 1A-6A.

Clause 1B. A device for decoding encoded point cloud data, the device comprising: a memory configured to store the encoded point cloud data; and one or more processors, implemented in circuitry, and configured to: for a point of a point cloud, determine a first color value for a first color component based on a first predicted value and a first residual value; apply a scaling factor to the first residual value to determine a predicted second residual value, wherein the scaling factor has one or both of a non-integer value or an absolute value greater than one; for the point of the point cloud, receive a second residual value in the encoded point cloud data; determine a final second residual value based on the predicted second residual value and the received second residual value; and for the point of the point cloud, determine a second color value for a second color component based on a second predicted value and the final second residual value.

Clause 2B. The device of clause 1B, wherein the one or more processors are further configured to: receive, in the point cloud data, information indicative of a scalar value, wherein the scalar value is an integer value, and wherein to apply the scaling factor, the one or more processors are further configured to perform a multiplication of the first residual value by the scalar value.

Clause 3B. The device of clause 2B, wherein to apply the scaling factor, the one or more processors are further configured to perform a bit shift operation comprising a right shift by 2.

Clause 4B. The device of clause 2B, wherein the information indicative of the scalar value comprises a difference value corresponding to a difference between the scalar value and a previously determined scalar value.

Clause 5B. The device of clause 4B, wherein the point cloud comprises a point cloud for a first level of detail and the previously determined scalar value is for a second level of detail that is different than the first level of detail.

Clause 6B. The device of clause 2B, wherein to receive the information indicative of the scalar value, the one or more processors are further configured to receive the information indicative of the scalar value in an attribute slice header syntax structure.

Clause 7B. The device of clause 1B, wherein the one or more processors are further configured to: determine the second predicted value for the point of the point cloud based on a value for a different point of the point cloud.

Clause 8B. The device of clause 1B, wherein the point cloud comprises a point cloud for a first level of detail, and wherein to determine the scaling factor, the one or more processors are further configured to determine the scaling factor based on a scaling factor for a second level of detail that is different than the first level of detail.

Clause 9B. The device of clause 1B, wherein the first color component comprises a green component and the second color component comprises a red component.

Clause 10B. The device of clause 1B, wherein the first color component comprises a green component and the second color component comprises a blue component.

Clause 11B. The device of clause 1B, wherein the one or more processors are further configured to: apply a second scaling factor to the first residual value to determine a predicted third residual value, wherein the second scaling factor has one or both of a non-integer value or an absolute value greater than one; for the point of the point cloud, receive a third residual value in the encoded point cloud data; determine a final third residual value based on the predicted third residual value and the received third residual value; and for the point of the point cloud, determine a third color value for a third color component based on a third predicted value and the final third residual value.

Clause 12B. The device of clause 1B, wherein the one or more processors are further configured to reconstruct the point cloud.

Clause 13B. The device of clause 12B, wherein the one or more processors are further configured to generate a map of an interior of a building based on the reconstructed point cloud.

Clause 14B. The device of clause 12B, wherein the one or more processors are further configured to perform an autonomous navigation operation based on the reconstructed point cloud.

Clause 15B. The device of clause 12B, wherein the one or more processors are further configured to generate computer graphics based on the reconstructed point cloud.

Clause 16B. The device of clause 12B, wherein the one or more processors are configured to: determine a position of a virtual object based on the reconstructed point cloud; and generate an extended reality (XR) visualization in which the virtual object is at the determined position.

Clause 17B. The device of clause 12B, further comprising a display to present imagery based on the reconstructed point cloud.

Clause 18B. The device of clause 1B, wherein the device comprises one or more of a mobile phone, a tablet computer, a vehicle, or an extended reality device.

Clause 19B. A method of decoding encoded point cloud data, the method comprising: for a point of a point cloud, determining a first color value for a first color component based on a first predicted value and a first residual value; applying a scaling factor to the first residual value to determine a predicted second residual value, wherein the scaling factor has one or both of a non-integer value or an absolute value greater than one; for the point of the point cloud, receiving a second residual value in the encoded point cloud data; determining a final second residual value based on the predicted second residual value and the received second residual value; and for the point of the point cloud, determining a second color value for a second color component based on a second predicted value and the final second residual value.

Clause 20B. The method of clause 19B, further comprising: receiving, in the point cloud data, information indicative of a scalar value, wherein the scalar value is an integer value, and wherein applying the scaling factor comprises performing a multiplication of the first residual value by the scalar value.

Clause 21B. The device of clause 20B, wherein applying the scaling factor comprises performing a bit shift operation comprising a right shift by 2.

Clause 22B. The device of clause 20B, wherein the information indicative of the scalar value comprises a difference value corresponding to a difference between the scalar value and a previously determined scalar value.

Clause 23B. The device of clause 22B, wherein the point cloud comprises a point cloud for a first level of detail and the previously determined scalar value is for a second level of detail that is different than the first level of detail.

Clause 24B. The device of clause 20B, wherein receiving the information indicative of the scalar value comprises receiving the information indicative of the scalar value in an attribute slice header syntax structure.

Clause 25B. The method of clause 19B, further comprising: determining the second predicted value for the point of the point cloud based on a value for a different point of the point cloud.

Clause 26B. The method of clause 19B, further comprising: determining the scaling factor based on a scaling factor for a second level of detail.

Clause 27B. The method of clause 19B, wherein the first color component comprises a green component and the second color component comprises a red component.

Clause 28B. The method of clause 19B, wherein the first color component comprises a green component and the second color component comprises a blue component.

Clause 29B. The method of clause 19B, further comprising: applying a second scaling factor to the first residual value to determine a predicted third residual value, wherein the second scaling factor has one or both of a non-integer value or an absolute value greater than one; for the point of the point cloud, receiving a third residual value in the encoded point cloud data; determining a final third residual value based on the predicted third residual value and the received third residual value; and for the point of the point cloud, determining a third color value for a third color component based on a third predicted value and the final third residual value.

Clause 30B. A computer-readable storage medium storing instructions that when executed by one or more processors cause the one or more processors to: for a point of a point cloud, determine a first color value for a first color component based on a first predicted value and a first residual value; apply a scaling factor to the first residual value to determine a predicted second residual value, wherein the scaling factor has one or both of a non-integer value or an absolute value greater than one; for the point of the point cloud, receive a second residual value in the encoded point cloud data; determine a final second residual value based on the predicted second residual value and the received second residual value; and for the point of the point cloud, determine a second color value for a second color component based on a second predicted value and the final second residual value.

Clause 31B. A device for encoding point cloud data, the device comprising: a memory configured to store the encoded point cloud data; and one or more processors, implemented in circuitry, and configured to: for a point of a point cloud, determine a first color value for a first color component; encode the first color value for the first color component as a first predicted value and a first residual value; for the point of the point cloud, determine a second color value for a second color component; determine a second predicted value for the second color value for the second color component; determine a second residual value for the second color value for the second color component; apply a scaling factor to the first residual value to determine a predicted second residual value, wherein the scaling factor has one or both of a non-integer value or an absolute value greater than one; and generate, for inclusion in the point cloud data, a syntax element representing a difference between the second residual value and the predicted second residual value.

Clause 32B. The device of clause 31B, wherein the one or more processors are further configured to: generate, for inclusion in the point cloud data, information indicative of a scalar value, wherein the scalar value is an integer value, and wherein to apply the scaling factor, the one or more processors are further configured to perform a multiplication of the first residual value by the scalar value.

Clause 33B. The device of clause 32B, wherein to apply the scaling factor, the one or more processors are further configured to perform a bit shift operation comprising a right shift by 2.

Clause 34B. The device of clause 32B, wherein the information indicative of the scalar value comprises a difference value corresponding to a difference between the scalar value and a previously determined scalar value.

Clause 35B. The device of clause 34B, wherein the point cloud comprises a point cloud for a first level of detail and the previously determined scalar value is for a second level of detail that is different than the first level of detail.

Clause 36B. The device of clause 32B, wherein to include the information indicative of the scalar value in the point cloud data, the one or more processors are further configured to include the information indicative of the scalar value in an attribute slice header syntax structure.

Clause 37B. The device of clause 32B, wherein to generate the scalar value, the one or more processors are further configured to include the scalar value in an attribute slice header syntax structure.

Clause 38B. The device of clause 31B, wherein the one or more processors are further configured to: determine the second predicted value for the point of the point cloud based on a value for a different point of the point cloud.

Clause 39B. The device of clause 31B, wherein the point cloud comprises a point cloud for a first level of detail, and wherein to determine the scaling factor, the one or more processors are further configured to determine the scaling factor based on a scaling factor for a second level of detail that is different than the first level of detail.

Clause 40B. The device of clause 31B, wherein the first color component comprises a green component and the second color component comprises a red component.

Clause 41B. The device of clause 31B, wherein the first color component comprises a green component and the second color component comprises a blue component.

Clause 42B. The device of clause 31B, further comprising a sensor to generate the point cloud data.

Clause 1C. A device for decoding encoded point cloud data, the device comprising: a memory configured to store the encoded point cloud data; and one or more processors, implemented in circuitry, and configured to: for a point of a point cloud, determine a first color value for a first color component based on a first predicted value and a first residual value; apply a scaling factor to the first residual value to determine a predicted second residual value, wherein the scaling factor has one or both of a non-integer value or an absolute value greater than one; for the point of the point cloud, receive a second residual value in the encoded point cloud data; determine a final second residual value based on the predicted second residual value and the received second residual value; and for the point of the point cloud, determine a second color value for a second color component based on a second predicted value and the final second residual value.

Clause 2C. The device of clause 1C, wherein the one or more processors are further configured to: receive, in the point cloud data, information indicative of a scalar value, wherein the scalar value is an integer value, and wherein to apply the scaling factor, the one or more processors are further configured to perform a multiplication of the first residual value by the scalar value.

Clause 3C. The device of clause 2C, wherein to apply the scaling factor, the one or more processors are further configured to perform a bit shift operation comprising a right shift by 2.

Clause 4C. The device of clause 2C or 3C, wherein the information indicative of the scalar value comprises a difference value corresponding to a difference between the scalar value and a previously determined scalar value.

Clause 5C. The device of clause 4C, wherein the point cloud comprises a point cloud for a first level of detail and the previously determined scalar value is for a second level of detail that is different than the first level of detail.

Clause 6C. The device of any of clauses 2C-5C, wherein to receive the information indicative of the scalar value, the one or more processors are further configured to receive the information indicative of the scalar value in an attribute slice header syntax structure.

Clause 7C. The device of any of clauses 1C-6C, wherein the one or more processors are further configured to: determine the second predicted value for the point of the point cloud based on a value for a different point of the point cloud.

Clause 8C. The device of any of clauses 1C-7C, wherein the point cloud comprises a point cloud for a first level of detail, and wherein to determine the scaling factor, the one or more processors are further configured to determine the scaling factor based on a scaling factor for a second level of detail that is different than the first level of detail.

Clause 9C. The device of any of clauses 1C-8C, wherein the first color component comprises a green component and the second color component comprises a red component.

Clause 10C. The device of any of clauses 1C-8C, wherein the first color component comprises a green component and the second color component comprises a blue component.

Clause 11C. The device of any of clauses 1C-10C, wherein the one or more processors are further configured to: apply a second scaling factor to the first residual value to determine a predicted third residual value, wherein the second scaling factor has one or both of a non-integer value or an absolute value greater than one; for the point of the point cloud, receive a third residual value in the encoded point cloud data; determine a final third residual value based on the predicted third residual value and the received third residual value; and for the point of the point cloud, determine a third color value for a third color component based on a third predicted value and the final third residual value.

Clause 12C. The device of any of clauses 1C-12C, wherein the one or more processors are further configured to reconstruct the point cloud.

Clause 13C. The device of clause 12C, wherein the one or more processors are further configured to generate a map of an interior of a building based on the reconstructed point cloud.

Clause 14C. The device of clause 12C, wherein the one or more processors are further configured to perform an autonomous navigation operation based on the reconstructed point cloud.

Clause 15C. The device of clause 12C, wherein the one or more processors are further configured to generate computer graphics based on the reconstructed point cloud.

Clause 16C. The device of clause 12C, wherein the one or more processors are configured to: determine a position of a virtual object based on the reconstructed point cloud; and generate an extended reality (XR) visualization in which the virtual object is at the determined position.

Clause 17C. The device of nay of clauses 12C-16C, further comprising a display to present imagery based on the reconstructed point cloud.

Clause 18C. The device of any of clauses 12C, 14C, or 17C, wherein the device comprises one or more of a mobile phone, a tablet computer, a vehicle, or an extended reality device.

Clause 19C. A method of decoding encoded point cloud data, the method comprising: for a point of a point cloud, determining a first color value for a first color component based on a first predicted value and a first residual value; applying a scaling factor to the first residual value to determine a predicted second residual value, wherein the scaling factor has one or both of a non-integer value or an absolute value greater than one; for the point of the point cloud, receiving a second residual value in the encoded point cloud data; determining a final second residual value based on the predicted second residual value and the received second residual value; and for the point of the point cloud, determining a second color value for a second color component based on a second predicted value and the final second residual value.

Clause 20C. The method of clause 19C, further comprising: receiving, in the point cloud data, information indicative of a scalar value, wherein the scalar value is an integer value, and wherein applying the scaling factor comprises performing a multiplication of the first residual value by the scalar value.

Clause 21C. The device of clause 20C, wherein applying the scaling factor comprises performing a bit shift operation comprising a right shift by 2.

Clause 22C. The device of clause 20C or 21C, wherein the information indicative of the scalar value comprises a difference value corresponding to a difference between the scalar value and a previously determined scalar value.

Clause 23C. The device of clause 22C, wherein the point cloud comprises a point cloud for a first level of detail and the previously determined scalar value is for a second level of detail that is different than the first level of detail.

Clause 24C. The device of any of clauses 20C-23C, wherein receiving the information indicative of the scalar value comprises receiving the information indicative of the scalar value in an attribute slice header syntax structure.

Clause 25C. The method of any of clauses 19C-24C, further comprising: determining the second predicted value for the point of the point cloud based on a value for a different point of the point cloud.

Clause 26C. The method of any of clauses 19C-25C, wherein determining the scaling factor comprises determining the scaling factor based on a scaling factor for a second level of detail.

Clause 27C. The method of any of clauses 19C-26C, wherein the first color component comprises a green component and the second color component comprises a red component.

Clause 28C. The method of any of clauses 19C-26C, wherein the first color component comprises a green component and the second color component comprises a blue component.

Clause 29C. The method of any of clauses 19C-28C, further comprising: applying a second scaling factor to the first residual value to determine a predicted third residual value, wherein the second scaling factor has one or both of a non-integer value or an absolute value greater than one; for the point of the point cloud, receiving a third residual value in the encoded point cloud data determining a final third residual value based on the predicted third residual value and the received third residual value; and for the point of the point cloud, determining a third color value for a third color component based on a third predicted value and the final third residual value.

Clause 30C. A computer-readable storage medium storing instructions that when executed by one or more processors cause the one or more processors to: for a point of a point cloud, determine a first color value for a first color component based on a first predicted value and a first residual value; apply a scaling factor to the first residual value to determine a predicted second residual value, wherein the scaling factor has one or both of a non-integer value or an absolute value greater than one; for the point of the point cloud, receive a second residual value in the encoded point cloud data; determine a final second residual value based on the predicted second residual value and the received second residual value; and for the point of the point cloud, determine a second color value for a second color component based on a second predicted value and the final second residual value.

Clause 31C. A device for encoding point cloud data, the device comprising: a memory configured to store the encoded point cloud data; and one or more processors, implemented in circuitry, and configured to: for a point of a point cloud, determine a first color value for a first color component; encode the first color value for the first color component as a first predicted value and a first residual value; for the point of the point cloud, determine a second color value for a second color component; determine a second predicted value for the second color value for the second color component; determine a second residual value for the second color value for the second color component; apply a scaling factor to the first residual value to determine a predicted second residual value, wherein the scaling factor has one or both of a non-integer value or an absolute value greater than one; and generate, for inclusion in the point cloud data, a syntax element representing a difference between the second residual value and the predicted second residual value.

Clause 32C. The device of clause 31C, wherein the one or more processors are further configured to: generate, for inclusion in the point cloud data, information indicative of a scalar value, wherein the scalar value is an integer value, and wherein to apply the scaling factor, the one or more processors are further configured to perform a multiplication of the first residual value by the scalar value.

Clause 33C. The device of clause 32C, wherein to apply the scaling factor, the one or more processors are further configured to perform a bit shift operation comprising a right shift by 2.

Clause 34C. The device of clause 32C or 33C, wherein the information indicative of the scalar value comprises a difference value corresponding to a difference between the scalar value and a previously determined scalar value.

Clause 35C. The device of clause 34C, wherein the point cloud comprises a point cloud for a first level of detail and the previously determined scalar value is for a second level of detail that is different than the first level of detail.

Clause 36C. The device of any of clauses 32C-35C, wherein to include the information indicative of the scalar value in the point cloud data, the one or more processors are further configured to include the information indicative of the scalar value in an attribute slice header syntax structure.

Clause 37C. The device of any of clauses 32C-36C, wherein to generate the scalar value, the one or more processors are further configured to include the scalar value in an attribute slice header syntax structure.

Clause 38C. The device of any of clauses 31C-37C, wherein the one or more processors are further configured to: determine the second predicted value for the point of the point cloud based on a value for a different point of the point cloud.

Clause 39C. The device of any of clauses 31C-38C, wherein the point cloud comprises a point cloud for a first level of detail, and wherein to determine the scaling factor, the one or more processors are further configured to determine the scaling factor based on a scaling factor for a second level of detail that is different than the first level of detail.

Clause 40C. The device of any of clauses 31C-39C, wherein the first color component comprises a green component and the second color component comprises a red component.

Clause 41C. The device of any of clauses 31C-39C, wherein the first color component comprises a green component and the second color component comprises a blue component.

Clause 42C. The device of any of clauses 31C-41C, further comprising a sensor to generate the point cloud data.

Examples in the various aspects of this disclosure may be used individually or in any combination.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for decoding encoded point cloud data to reconstruct a point cloud, the device comprising:
    a memory configured to store the encoded point cloud data; and
    one or more processors, implemented in circuitry, and configured to:
        for a point of the point cloud, determine a first color value for a first color component based on a first predicted value and a first residual value;
        receive, in the encoded point cloud data, a syntax element indicating a scalar value, wherein the scalar value is an integer value;
        apply a scaling factor to the first residual value to determine a predicted second residual value, wherein the scaling factor has a non-integer value, and wherein to apply the scaling factor to the first residual value, the one or more processors are further configured to:
            perform a multiplication by the scalar value; and
            perform a right shift operation, wherein a result of a combination of the multiplication by the scalar value and the right shift operation is equal to the scaling factor;
        for the point of the point cloud, receive a second residual value in the encoded point cloud data;
        determine a final second residual value based on the predicted second residual value and the received second residual value; and
        for the point of the point cloud, determine a second color value for a second color component based on a second predicted value and the final second residual value.

2. The device of claim 1, wherein the right shift operation comprises a right shift by 2.

3. The device of claim 1, wherein the the syntax element indicating the scalar value comprises a difference value corresponding to a difference between the scalar value and a previously determined scalar value.

4. The device of claim 3, wherein the point cloud comprises a point cloud for a first level of detail and the previously determined scalar value is for a second level of detail that is different than the first level of detail.

5. The device of claim 1, wherein to receive the syntax element, the one or more processors are further configured to receive the syntax element in an attribute slice header syntax structure.

6. The device of claim 1, wherein the one or more processors are further configured to:
    determine the second predicted value for the point of the point cloud based on a value for a different point of the point cloud.

7. The device of claim 1, wherein the point cloud comprises a point cloud for a first level of detail, and wherein to determine the scaling factor, the one or more processors are further configured to determine the scaling factor based on a scaling factor for a second level of detail that is different than the first level of detail.

8. The device of claim 1, wherein the first color component comprises a green component and the second color component comprises a red component.

9. The device of claim 1, wherein the first color component comprises a green component and the second color component comprises a blue component.

10. The device of claim 1, wherein the one or more processors are further configured to:
    apply a second scaling factor to the first residual value to determine a predicted third residual value, wherein the second scaling factor has one or both of a non-integer value or an absolute value greater than one;
    for the point of the point cloud, receive a third residual value in the encoded point cloud data;
    determine a final third residual value based on the predicted third residual value and the received third residual value; and
    for the point of the point cloud, determine a third color value for a third color component based on a third predicted value and the final third residual value.

11. The device of claim 1, wherein the one or more processors are further configured to reconstruct the point cloud.

12. The device of claim 11, wherein the one or more processors are further configured to generate a map of an interior of a building based on the reconstructed point cloud.

13. The device of claim 11, wherein the one or more processors are further configured to perform an autonomous navigation operation based on the reconstructed point cloud.

14. The device of claim 11, wherein the one or more processors are further configured to generate computer graphics based on the reconstructed point cloud.

15. The device of claim 11, wherein the one or more processors are configured to:
    determine a position of a virtual object based on the reconstructed point cloud; and
    generate an extended reality (XR) visualization in which the virtual object is at the determined position.

16. The device of claim 11, further comprising a display to present imagery based on the reconstructed point cloud.

17. The device of claim 1, wherein the device comprises one or more of a mobile phone, a tablet computer, a vehicle, or an extended reality device.

18. A method of decoding encoded point cloud data to reconstruct a point cloud, the method comprising:
for a point of a point cloud, determining a first color value for a first color component based on a first predicted value and a first residual value;
receiving, in the encoded point cloud data, a syntax element indicating a scalar value, wherein the scalar value is an integer value;
applying a scaling factor to the first residual value to determine a predicted second residual value, wherein the scaling factor has a non-integer value wherein applying the scaling factor to the first residual value comprises:
performing a multiplication by the scalar value; and
performing a right shift operation, wherein a result of a combination of the multiplication by the scalar value and the right shift operation is equal to the scaling factor;
for the point of the point cloud, receiving a second residual value in the encoded point cloud data;
determining a final second residual value based on the predicted second residual value and the received second residual value; and
for the point of the point cloud, determining a second color value for a second color component based on a second predicted value and the final second residual value.

19. The device of claim 18, wherein performing the right shift operation comprises applying a right shift by 2.

20. The device of claim 18, wherein the the syntax element indicating the scalar value comprises a difference value corresponding to a difference between the scalar value and a previously determined scalar value.

21. The device of claim 20, wherein the point cloud comprises a point cloud for a first level of detail and the previously determined scalar value is for a second level of detail that is different than the first level of detail.

22. The device of claim 18, wherein receiving the syntax element comprises receiving the syntax element in an attribute slice header syntax structure.

23. The method of claim 18, further comprising:
determining the second predicted value for the point of the point cloud based on a value for a different point of the point cloud.

24. The method of claim 18, further comprising:
determining the scaling factor based on a scaling factor for a second level of detail.

25. The method of claim 18, wherein the first color component comprises a green component and the second color component comprises a red component.

26. The method of claim 18, wherein the first color component comprises a green component and the second color component comprises a blue component.

27. The method of claim 18, further comprising:
applying a second scaling factor to the first residual value to determine a predicted third residual value, wherein the second scaling factor has one or both of a non-integer value or an absolute value greater than one;
for the point of the point cloud, receiving a third residual value in the encoded point cloud data;
determining a final third residual value based on the predicted third residual value and the received third residual value; and
for the point of the point cloud, determining a third color value for a third color component based on a third predicted value and the final third residual value.

28. A computer-readable storage medium storing instructions that when executed by one or more processors cause the one or more processors to:
for a point of a point cloud of encoded point cloud data, determine a first color value for a first color component based on a first predicted value and a first residual value;
receive, in the encoded point cloud data, a syntax element indicating a scalar value, wherein the scalar value is an integer value;
apply a scaling factor to the first residual value to determine a predicted second residual value, wherein the scaling factor has a non-integer value, and wherein to apply the scaling factor to the first residual value, the instructions cause the one or more processors to:
perform a multiplication by the scalar value; and
perform a right shift operation, wherein a result of a combination of the multiplication by the scalar value and the right shift operation is equal to the scaling factor;
for the point of the point cloud, receive a second residual value in the encoded point cloud data;
determine a final second residual value based on the predicted second residual value and the received second residual value; and
for the point of the point cloud, determine a second color value for a second color component based on a second predicted value and the final second residual value.

29. A device for encoding point cloud data to generate encoded point cloud data, the device comprising:
a memory configured to store the point cloud data; and
one or more processors, implemented in circuitry, and configured to:
for a point of a point cloud, determine a first color value for a first color component;
encode the first color value for the first color component as a first predicted value and a first residual value;
for the point of the point cloud, determine a second color value for a second color component;
determine a second predicted value for the second color value for the second color component;
determine a second residual value for the second color value for the second color component;
apply a scaling factor to the first residual value to determine a predicted second residual value, wherein the scaling factor has a non-integer value, wherein to apply the scaling factor to the first residual value, the one or more processors are further configured to:
perform a multiplication by a scalar value; and
perform a right shift operation, wherein a result of a combination of the multiplication by the scalar value and the right shift operation is equal to the scaling factor; and
generate, for inclusion in the encoded point cloud data, a syntax element indicating the scalar value.

30. The device of claim 29, wherein the right shift operation comprises a right shift by 2.

31. The device of claim 29, wherein the syntax element indicating the scalar value comprises a difference value corresponding to a difference between the scalar value and a previously determined scalar value.

32. The device of claim 31, wherein the point cloud comprises a point cloud for a first level of detail and the previously determined scalar value is for a second level of detail that is different than the first level of detail.

33. The device of claim 29, wherein to include the syntax element in the point cloud data, the one or more processors are further configured to include the syntax element in an attribute slice header syntax structure.

34. The device of claim 29, wherein the one or more processors are further configured to:
   determine the second predicted value for the point of the point cloud based on a value for a different point of the point cloud.

35. The device of claim 29, wherein the point cloud comprises a point cloud for a first level of detail, and wherein to determine the scaling factor, the one or more processors are further configured to determine the scaling factor based on a scaling factor for a second level of detail that is different than the first level of detail.

36. The device of claim 29, wherein the first color component comprises a green component and the second color component comprises a red component.

37. The device of claim 29, wherein the first color component comprises a green component and the second color component comprises a blue component.

38. The device of claim 29, further comprising a sensor to generate the point cloud data.

* * * * *